US008213735B2

(12) United States Patent
Cooksey et al.

(10) Patent No.: US 8,213,735 B2
(45) Date of Patent: Jul. 3, 2012

(54) METHODS AND APPARATUS FOR PERFORMING IMAGE BINARIZATION

(75) Inventors: Erica Drew Cooksey, Tampa, FL (US); William Douglas Withers, Crofton, MD (US)

(73) Assignee: Accusoft Corporation, Tampa, FL (US)

( * ) Notice: Subject to any disclaimer, the term of this patent is extended or adjusted under 35 U.S.C. 154(b) by 378 days.

(21) Appl. No.: 12/576,920

(22) Filed: Oct. 9, 2009

(65) Prior Publication Data

US 2010/0092087 A1 Apr. 15, 2010

Related U.S. Application Data

(60) Provisional application No. 61/104,634, filed on Oct. 10, 2008.

(51) Int. Cl.
*G06K 9/40* (2006.01)
*G06K 9/34* (2006.01)

(52) U.S. Cl. .......................................... 382/260; 382/176
(58) Field of Classification Search .................. 382/260, 382/257, 256, 254, 176
See application file for complete search history.

(56) References Cited

U.S. PATENT DOCUMENTS

| 4,979,229 | A | * | 12/1990 | Moolenaar | 382/299 |
| 6,393,150 | B1 | * | 5/2002 | Lee et al. | 382/176 |
| 6,459,816 | B2 | * | 10/2002 | Matsuura et al. | 382/248 |
| 8,068,684 | B2 | * | 11/2011 | Dauw et al. | 382/243 |
| 2004/0032600 | A1 | * | 2/2004 | Burns et al. | 358/1.9 |

OTHER PUBLICATIONS

N. Otsu, "A Threshold Selection Method from Gray-Level Histograms," IEEE Transactions on Systems, Man, and Cybernetics, vol. SMC-9, No. 1, pp. 62-66, Jan. 1979.
R.M. Haralick, S.R. Sternberg, X. Zhuang, "Image Analysis Using Mathematical Morphology," IEEE Transactions on Pattern Analysis and Machine Intelligence, vol. PAMI-9, No. 4, pp. 532-550, Jul. 1987.
S.R. Sternberg, "Grayscale Morphology," Computer Vision, Graphics and Image Processing, vol. 35, No. 3, pp. 333-355, Sep. 1986.
A. Morales, R. Acharya, and S.J. Ko, "Morphological Pyramids with Alternating Sequential Filters," IEEE Transactions on Image Processing, vol. 4, No. 7, pp. 965-977, Jul. 1995.
J. Gil and R. Kimmel, "Efficient Dilation, Erosion, Opening, and Closing Algorithms," IEEE Transaction on Pattern Analysis and Machine Intelligence, vol. 24, No. 12, pp. 1606-1617, Dec. 2002.
J. Gil and M. Werman, "Computing 2-D Min, Median, and Max Filters," IEEE Transaction on Pattern Analysis and Machine Intelligence, vol. 15, No. 5 pp. 504-507, May 1993.
D.S. Bloomberg, "Multiresolution Morphological Approach to Document Image Analysis," ICDAR, pp. 1-12, 1991.

(Continued)

*Primary Examiner* — Yon Couso
(74) *Attorney, Agent, or Firm* — Straub & Pokotylo; Michael P. Straub; Stephen T. Straub

(57) ABSTRACT

Methods and apparatus for binarizing images represented by sets of multivalent pixel values in a computationally efficient manner are described In a grayscale image to be binarized, one group of pixel values represents "foreground", e.g., text to be converted to black, while another group represents a shaded "background" region to be converted, e.g., to white. The difference between foreground and background is often a function of the scale of the image components, e.g., text and/or other images. Filters in the form of morphological operators, computationally efficient quick-open and quick-close morphological operators are employed to binarize images, e.g., grayscale images. The methods and apparatus effectively handle both smooth and sharp image background structures in a computationally efficient manner.

17 Claims, 16 Drawing Sheets

OTHER PUBLICATIONS

Y.M.Y. Hasan and L.J. Karam, "Morphological Text Extraction from Images," IEEE Transactions on Image Processing, vol. 9, No. 11, pp. 1978-1983, Nov. 2000.

M. Cumplido, P. Montolio, and A. Gasull, "Morphological Preprocessing and Binarization for OCR Systems," in Mathematical Morphology and Its Applications to Signal Processing, P.A. Margos, R.W. Schafer, and M.A. Butt, Eds., pp. 393-400, Springer, 1996.

I. Pitas, "Fast Algorithms for Running Ordering and Max/Min Calculation," IEEE Transactions on Circuits and Systems, vol. 36, No. 6, pp. 795-804, Jun. 1989.

E. Urbach and M. Wilkinson, "Efficient 2-D Grayscale Morphological Transformations With Arbitrary Flat Structuring Elements," IEEE Transactions on Image Processing, vol. 17, No. 1, pp. 1-8, Jan. 2008.

Zeng et al., "Point-wise extended visual masking for JPEG-2000 Image Compression", IEEE Proc. of Intl. Conference on Image Processing, vol. 1, pp. 657-660, (2000).

Taubman, "High Performance Scalable Image compression with Ebcot", Proceedings of the IEEE Intl. Conf. on Image Processing, vol. 3, pp. 344-348, 1999.

Watson et al., "Visibility of Wavelet Quantization Noise", IEEE Transactions on Image Processing, vol. 6, No. 8, pp. 1164-1175, Aug. 1997.

Mazzarri et al., "Perceptual Embedded Image Coding Using Wavelet Transforms", Proc. IEEE Intl. Conference Image Processing, vol. 1, pp. 586-589, 1995.

Hontsch et al., "APIC: Adaptive Perceptual Image Coding Based on Subband Decomposition with Locally Adaptive Perceptual Weighting", Proc. of Intl. Conf. on Image Proc. 1997, vol. 1, pp. 37-40, 1997.

Chou et al., "A Perceptually Tuned Subband Image Coder Based on the Measure of Just-Noticeable-Distortion Profile", IEEE Transactions on Circuits and Systems for Video Technology, vol. 5, No. 6, pp. 467-476. Dec. 1995.

Ferwerda et al., "A Model of visual Masking for Computer Graphics", Proc. SIGGRAPH '97, pp. 143-152, 1997.

Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

Sharifi et al., "Estimation of Shape Parameter for Generalized Gaussian Distributions in Subband Decompositions of Video", IEEE Transactions on Circuits and Systems for Video Technology, vol. 5, No. 1, pp. 52-56, Feb. 1995.

Wang et al., "Image Quality Assessment: From Error Visibility to Structural Similarity", IEEE Transactions on Image Processing, vol. 13, No. 4, pp. 600-612. Apr. 2004.

Wang et al., "Multi-Scale Structural Similarity for Image Quality Assessment", IEEE Asilomar Conference on Signals, Systems and Computers, pp. 1398-1402, 2003.

Grottke et al., "Apriori Rate Allocation in Wavelet-based Image Compression", Proc. of AXMEDIX 2006, pp. 329-336, 2006.

Wu et al., "Rate-Constrained Picture-Adaptive Quantization for JPEG Baseline Coders", ICASSP-93, vol. 5, pp. V-389-V392, 1993.

Taubman, "High Performance Scalable Image Compression with EBCOT", IEEE Transactions on Image Processing, vol. 9, No. 7, pp. 1158-1170, 2000.

Daly, "Application of a noise-adaptive contrast sensitivity function to image data compression", SPIEE, vol. 29, No. 8, pp. 977-987, Aug. 1990.

* cited by examiner

1300

*foobar*

Potrzebie

*foobar*

Potrzebie

| 2 | 2 | 2 | 8 | 8 | 8 | 8 | 8 | 8 | 8 |
|---|---|---|---|---|---|---|---|---|---|
| 3 | 2 | 8 | 8 | 8 | 15 | 8 | 8 | 8 | 2 |
| 2 | 8 | 8 | 8 | 8 | 8 | 8 | 8 | 3 | 8 |
| 8 | 8 | 8 | 8 | 8 | 8 | 8 | 2 | 8 | 9 |
| 8 | 8 | 8 | 8 | 8 | 9 | 3 | 9 | 8 | 8 |
| 10 | 8 | 8 | 8 | 8 | 2 | 8 | 8 | 8 | 8 |
| 8 | 8 | 8 | 8 | 2 | 2 | 9 | 8 | 8 | 8 |
| 8 | 8 | 8 | 2 | 8 | 2 | 8 | 8 | 8 | 8 |
| 8 | 8 | 8 | 2 | 8 | 2 | 8 | 8 | 8 | 8 |
| 8 | 8 | 8 | 8 | 2 | 2 | 8 | 8 | 8 | 8 |

| 2 | 2 | 2 | 8 | 8 | 8 | 8 | 8 | 8 | 8 |
|---|---|---|---|---|---|---|---|---|---|
| 3 | 3 | 8 | 8 | 8 | 15 | 8 | 8 | 8 | 8 |
| 3 | 8 | 8 | 8 | 8 | 8 | 8 | 8 | 8 | 8 |
| 8 | 8 | 8 | 8 | 8 | 8 | 8 | 8 | 8 | 9 |
| 8 | 8 | 8 | 8 | 8 | 9 | 8 | 9 | 8 | 8 |
| 10 | 8 | 8 | 8 | 8 | 8 | 8 | 8 | 8 | 8 |
| 8 | 8 | 8 | 8 | 8 | 8 | 9 | 8 | 8 | 8 |
| 8 | 8 | 8 | 8 | 8 | 8 | 8 | 8 | 8 | 8 |
| 8 | 8 | 8 | 8 | 8 | 8 | 8 | 8 | 8 | 8 |
| 8 | 8 | 8 | 8 | 8 | 8 | 8 | 8 | 8 | 8 |

| 2 | 2 | 2 | 8 | 8 | 8 | 8 | 8 | 8 | 8 |
|---|---|---|---|---|---|---|---|---|---|
| 2 | 2 | 8 | 8 | 8 | 8 | 8 | 8 | 8 | 2 |
| 2 | 8 | 8 | 8 | 8 | 8 | 8 | 8 | 3 | 8 |
| 8 | 8 | 8 | 8 | 8 | 8 | 8 | 2 | 8 | 8 |
| 8 | 8 | 8 | 8 | 8 | 8 | 3 | 8 | 8 | 8 |
| 8 | 8 | 8 | 8 | 8 | 2 | 8 | 8 | 8 | 8 |
| 8 | 8 | 8 | 8 | 2 | 2 | 8 | 8 | 8 | 8 |
| 8 | 8 | 8 | 2 | 2 | 2 | 8 | 8 | 8 | 8 |
| 8 | 8 | 8 | 2 | 2 | 2 | 8 | 8 | 8 | 8 |
| 8 | 8 | 8 | 2 | 2 | 2 | 8 | 8 | 8 | 8 |

| 0 | 0 | 0 | 0 | 0 | 0 | 0 | 0 | 0 | 0 |
|---|---|---|---|---|---|---|---|---|---|
| 1 | 1 | 0 | 0 | 0 | 7 | 0 | 0 | 0 | 6 |
| 1 | 0 | 0 | 0 | 0 | 0 | 0 | 0 | 5 | 0 |
| 0 | 0 | 0 | 0 | 0 | 0 | 0 | 6 | 0 | 1 |
| 0 | 0 | 0 | 0 | 0 | 1 | 5 | 1 | 0 | 0 |
| 2 | 0 | 0 | 0 | 0 | 6 | 0 | 0 | 0 | 0 |
| 0 | 0 | 0 | 0 | 6 | 6 | 1 | 0 | 0 | 0 |
| 0 | 0 | 0 | 6 | 6 | 6 | 0 | 0 | 0 | 0 |
| 0 | 0 | 0 | 6 | 6 | 6 | 0 | 0 | 0 | 0 |
| 0 | 0 | 0 | 6 | 6 | 6 | 0 | 0 | 0 | 0 |

| 2 | 2 | 2 | 8 | 8 | 8 | 8 | 8 | 8 | 8 |
|---|---|---|---|---|---|---|---|---|---|
| 3 | 2 | 8 | 8 | 8 | B | 8 | 8 | 8 | F |
| 2 | 8 | 8 | 8 | 8 | 8 | 8 | 8 | F | 8 |
| 8 | 8 | 8 | 8 | 8 | 8 | 8 | F | 8 | 9 |
| 8 | 8 | 8 | 8 | 8 | 9 | F | 9 | 8 | 8 |
| 10 | 8 | 8 | 8 | 8 | F | 8 | 8 | 8 | 8 |
| 8 | 8 | 8 | 8 | F | F | 9 | 8 | 8 | 8 |
| 8 | 8 | 8 | F | B | F | 8 | 8 | 8 | 8 |
| 8 | 8 | 8 | F | B | F | 8 | 8 | 8 | 8 |
| 8 | 8 | 8 | B | F | F | 8 | 8 | 8 | 8 |

| Pixel value: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Number remaining | 0 | 0 | 5 | 1 | 0 | 0 | 0 | 0 | 73 | 3 | 1 | 0 | 0 | 0 | 0 | 0 |

2602 → Pixel value
2604 → Number remaining

| B | B | B | B | B | B | B | B | B | B |
|---|---|---|---|---|---|---|---|---|---|
| B | B | B | B | B | B | B | B | B | F |
| B | B | B | B | B | B | B | B | F | B |
| B | B | B | B | B | B | B | F | B | B |
| B | B | B | B | B | B | F | B | B | B |
| B | B | B | B | B | F | B | B | B | B |
| B | B | B | B | F | F | B | B | B | B |
| B | B | B | F | B | F | B | B | B | B |
| B | B | B | F | B | F | B | B | B | B |
| B | B | B | B | F | F | B | B | B | B |

FIG. 27

METHODS AND APPARATUS FOR PERFORMING IMAGE BINARIZATION

RELATED APPLICATIONS

The present application claims the benefit of U.S. Provisional Patent Application Ser. No. 61/104,634 filed on Oct. 10, 2008 and titled "METHODS AND APPARATUS FOR CONVERTING AN IMAGE TO A BI-LEVEL IMAGE" which is hereby expressly incorporated by reference in its entirety.

FIELD OF THE INVENTION

The present invention relates to image processing methods and, more particularly, to image binarization, e.g., converting data, e.g., multivalent pixel values representing an image in shades of gray or color to a set of binary pixel values, e.g., black and white pixel values.

BACKGROUND OF THE INVENTION

The capture, storage, and transmission of digital images and digital video have become widespread. Image binarization is the task of converting a color or grayscale image to a bilevel image consisting of just two colors, e.g., black and white. The color or grayscale image is often represented by a set of multilevel pixel values, e.g., pixel values which cover a wide range of values corresponding to different grayscale or color levels. Such a set of pixel values is sometimes called a set of multivalent pixel values while a set of pixel values where the pixel values only assume one of two possible values is sometimes called a set of bi-valent pixel values.

Many image processing operations involving binarization deal with documents including text, e.g., documents which are to be subject to optical character recognition and/or other processing operations. The documents may be scanned to produce color or grayscale sets of image data which may then need to be subject to binarization prior to subsequent processing, e.g., form and/or text recognition processing.

Often an image to be processed includes "foreground" text and diagrams against a "background" which may be uniform or show various types of non uniformity. Information loss is an inherent aspect of the binarization process but it is usually an objective, as part of the binarization process, to preserve text and line elements of the image.

As noted above, binarization is frequently a preliminary step in tasks such as optical character recognition or image compression. In the easiest cases, an image can be effectively binarized by a simple direct thresholding algorithm, e.g., setting gray-values higher than a fixed threshold to white and gray-values lower than the threshold to black. The particular threshold value for an image might be chosen by analyzing the image gray-level statistics of the entire image and then using the determined threshold throughout the image.

In practice, direct thresholding often fails to effectively separate foreground and background in the presence of one or more complicating image characteristics, e.g., a varying background. A digital image captured from an original hard-copy may show shading of both foreground and background regions as a result of the image capture process, even if the original hard-copy document consisted of purely black and white. Even more challenging is the case of an image with sharply-bounded background regions of different colors. FIG. 1 shows an image 100 with smooth brightness variations in both foreground and background as well as sharp variations in background where the foreground is defined to be the text in the image, the background is everything else.

FIG. 2 shows an image 200 representing the result of binarizing the image 100 shown in FIG. 1 using a uniform threshold, e.g., a fixed pixel-value threshold used to assign pixels to either a foreground or background value. Note that on the left side of image 200 some text has been converted to white rather than black, indicating that for those particular areas the chosen threshold level is too low whereas in other areas, e.g., on the right side, background will be converted to black. In the areas where the background was converted to black, the threshold selected for those particular image areas was too high. From FIG. 2, it should be appreciated that in many cases using the same fixed threshold throughout an image results in errors during the binarization process.

No single threshold level can effectively binarize the image 100 shown in FIG. 1 because the text on the left is lighter than the background on the right although this may not be apparent at a glance, due to the human eye-brain's high effectiveness in distinguishing foreground from background.

Use of local thresholds for different portions of an image may have advantages over a single threshold but such an approach also has problems. FIG. 3 shows an image 300 resulting from a binarization process applied to the image 100, wherein the image 100 has been divided into subregions and a separate threshold value is chosen for each subregion. This approach effectively handles the issue of smooth shading. However, the sharp background edges generate unwanted artifacts in the binarized image. The binarization approach used to generate the image 300 has the disadvantage of being incapable of discriminating between the relevant sharp edges separating foreground and background and the irrelevant sharp edges separating one background region from another background region.

Clearly, an effective background-extraction operator can facilitate image binarization. Such an operator must be non-linear. To see this, consider the application of the operator to an image consisting of a single nonzero-valued pixel against a zero-valued background. The output image (the background) is then uniformly zero. As any image is a linear combination of such single-nonzero-pixel images, the operator, if linear, yields zero when applied to any image.

Morphological operators have been used as a tool for extracting various features (such as backgrounds) from both grayscale and binary images. Among the simplest morphological operators are dilation and erosion: the dilation (erosion) of a grayscale image by a flat structuring element can be defined as the image consisting of maximum (minimum) pixel values over all translates of a neighborhood of fixed size and shape (the structuring element). Many neighborhood shapes are employed for various special purposes, but the humble square neighborhood is one of the most popular choices owing to its simplicity and amenability to rapid computation. The opening operator is defined as an erosion followed by a dilation; the closing operator is defined as a dilation followed by an erosion, the same structuring element being used for both steps. In intuitive terms, the closing (opening) operator erases dark (bright) image features narrower than the scale of the structuring element. The alternating sequential filter (ASF) is defined as a iterated sequence of both opening operators $\omega$ and closing operators $\kappa$ applied to an image I:

$$ASF(I) = K_{e_n} \omega_{e_n} K_{e_{n-1}} \omega_{e_{n-1}} \ldots K_{e_1} \omega_{e_1}(I).$$

Here $e_1, e_2, \ldots, e_n$ denotes the sequence of structuring elements, generally taken to have successively increasing sizes. The iterated opening and closing operations erase both bright and dark narrow features, thus extracting the background.

One particular computationally intensive approach to image binarization has been to use an alternating sequential filter (ASF) to extract the image background and then define the foreground as those pixels deviating significantly from the background. The ASF method is described in: M. Cumplido, P. Montolio, and A. Gasull, "*Morphological preprocessing and binarization for ocr systems,*" in *Mathematical Morphology and Its Applications to Signal Processing*, pp. 393-401 (1996). The ASF based method is highly effective at binarizing images with smooth and/or sharp variations in background color but it achieves this effectiveness at a large computational cost largely due to the use of the iterative alternating sequential filter. In view of the above discussion it should be appreciated that there remains a need for methods of image binarization which are effective but less computationally complex than using an alternative sequential filter.

SUMMARY OF THE INVENTION

The present invention is directed to improved methods and apparatus for performing image binarization. The methods and system may be used to generate binary images from, e.g., a color or grayscale image.

The color or grayscale image may be a hardcopy image which is initially scanned to create a multivalent set of pixel values representing the image. The method of the present invention may be applied to a multivalent set of pixel values generated by scanning, a pre-existing set of pixel values representing an image or a set of computer generated pixel values. Regardless of the source of the multivalent set of image (e.g. pixel) values, the input set of pixel values may be processed in accordance with the present invention to generate a set of bivalent pixel values.

The methods and apparatus of the present invention use a binarization method which is less computationally complex than the known alternating sequential filter (ASF) method of image binarization while producing good results, i.e. results better than what would often be achieved using simple thresholding.

In one embodiment the method involves processing a first set of pixel values, e.g., multivalent pixel values, corresponding to a portion of an image. The image portion may be a small portion of the image or correspond to the entire image. The first set of pixel values may be generated by scanning a physical image or in another manner and represent the image in digital form, e.g., as a set of grayscale or color image data. The first set of pixel values is processed, in one exemplary embodiment, to generate a set of bivalent pixel values, e.g., a black and white representation of the portion of the image to which the first set of pixel values corresponds. The image portion may be the full image or some smaller portion of an image. The method, includes, in some embodiments, performing a first filtering operation on said first set of pixel values to generate a second set of pixel values, each pixel value in said second set of pixel values being not less than a corresponding pixel value in the first set; performing a second filtering operation on said first set of pixel values to generate a third set of pixel values, each pixel value in said third set of pixel values being not more than a corresponding pixel value in the first set; determining, for each of a plurality of pixel value locations in said portion of an image, a bivalent pixel value, based on the corresponding pixel values in at least two of said first, second and third sets of pixel values; and storing in a storage device, a set of determined binary pixel values corresponding to said portion of an image.

In some embodiments the first filtering operation removes dark image features narrower than a width of a first filter used by said first filtering operation to generate said second set of pixel values. In at least one exemplary embodiment, the first filtering operation is implemented using a quick-close filter. In at least one embodiment the second filtering operation removes light image features narrower than a width of a second filter used by said second filtering operation to generate said third set of pixel values. In some embodiments the said second filter operating is performed using a quick-open filter.

While the method of the present invention uses first and second filters in the form of quick-open and quick-close filters as part of the binarization process, the method is non-iterative and uses different filters than those used in the standard ASF approach. Thus, the method of the present invention avoids the heavy computational load imposed by the iterative ASF approach and its use of standard open and close operators as opposed to the quick-open and quick-close filters used in accordance with the present invention. While being less computationally intensive than the ASF approach, the methods of the present invention provide good results without incurring the computational burden imposed by the known iterative ASF binarization technique.

The binarization method of the invention can be implemented on a computer system operating under software modules which control the computer system to implement the image processing method of the invention. The generated binary set of pixel values representing an image or image portion can, and in some embodiments are, stored in memory and/or communicated to another device, e.g., via a communications network. In some embodiments implementing the invention, the generated binary set of pixel values are converted into a viewable image and displayed on a display device or are printed thereby allowing an operator or user of the system to view or hold in physical form an image generated from the binary pixel values generated by the method of the invention.

Various additional exemplary embodiments, features, and benefits of the methods and apparatus of the present invention are set forth below in the detailed description that follows.

BRIEF DESCRIPTION OF THE DRAWINGS

FIG. 13 illustrates a result of processing in accordance with one exemplary method.

FIG. 14 shows the final binary image obtained by applying one exemplary method of the invention to a set of pixel values representing the input image shown in FIG. 8.

FIGS. 17-27 show sets of pixel values which relate to a binarization example discussed in the present application.

DETAILED DESCRIPTION

This application describes a computationally efficient method of binarizing images. The images may have nonuniform foreground and background color or shading with the method still providing good results in most if not all cases. The method described herein is based, at least in part, on a pair of operations, e.g., filtering operations, which are less computational complex than the open and close operators used to implement the known ASF method.

The method of the present invention uses what are described herein as a "quick-close operator" and "quick-open operator" which are two types of morphological operators. When applied to a set of image data, the quick-open and quick-close operators perform filtering operations. Accordingly, the quick-open and quick-close operators are types of filters which have characteristics which will be discussed below.

In some embodiments, the filtering portion of the binarization method of the present invention involves roughly 19 comparison and 6 addition operations per pixel and, in most cases, effectively handles both smooth and sharp image background structures.

The quick-close operator is defined as follows. Fix a neighborhood size N. For a given pixel location L, consider the four N×N square neighborhoods having L at one corner, N and L being positive integers. Take the maximum pixel value over each of the four squares and then take the minimum of the four maximum values. Note that this may be viewed as an approximation of the standard closing operator which equals the minimum of the maximum values over all $N^2$ neighborhoods containing L but is computationally less intensive than the standard close operator. It is instructive to consider the effect of the quick-close operator applied to certain particular image structures.

Figure 4:
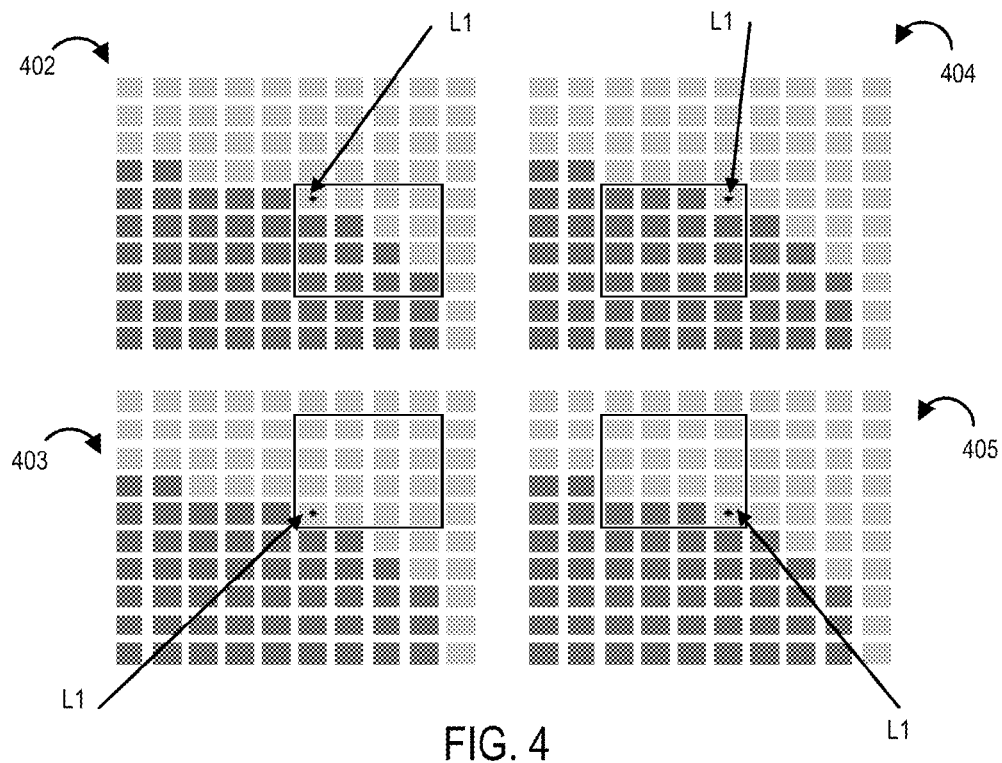
FIGS. 4, 5, and 6 illustrate pixel value groupings used as part of various filtering operations which can be used in various embodiments.

First consider a pixel with location L1 and value V on the bright side of a sharp edge as shown in the sets of pixel values 402, 403, 404, 405 shown in FIG. 4. Note the boundary between dark and light pixel values starting between the third and fourth pixel values from the top in the first column of pixel values which represents a sharp edge. The sets of pixel values 402, 403, 404 and 405 are the same but have different filter boundaries represented by the box applied to them. Different levels of shading are used in FIG. 4 to represent different level pixel values. Since each of the four neighborhoods represented as boxes with corners at L1 contains the pixel L1 itself, each has maximum pixel value V and the minimum of the four maxima is therefore also V. As a general principle, the quick-close operator does not replace a pixel value with a value smaller than the original pixel value nor greater than the maximum value over a (2N+1)×(2N+1) neighborhood centered at the pixel.

Figure 5:
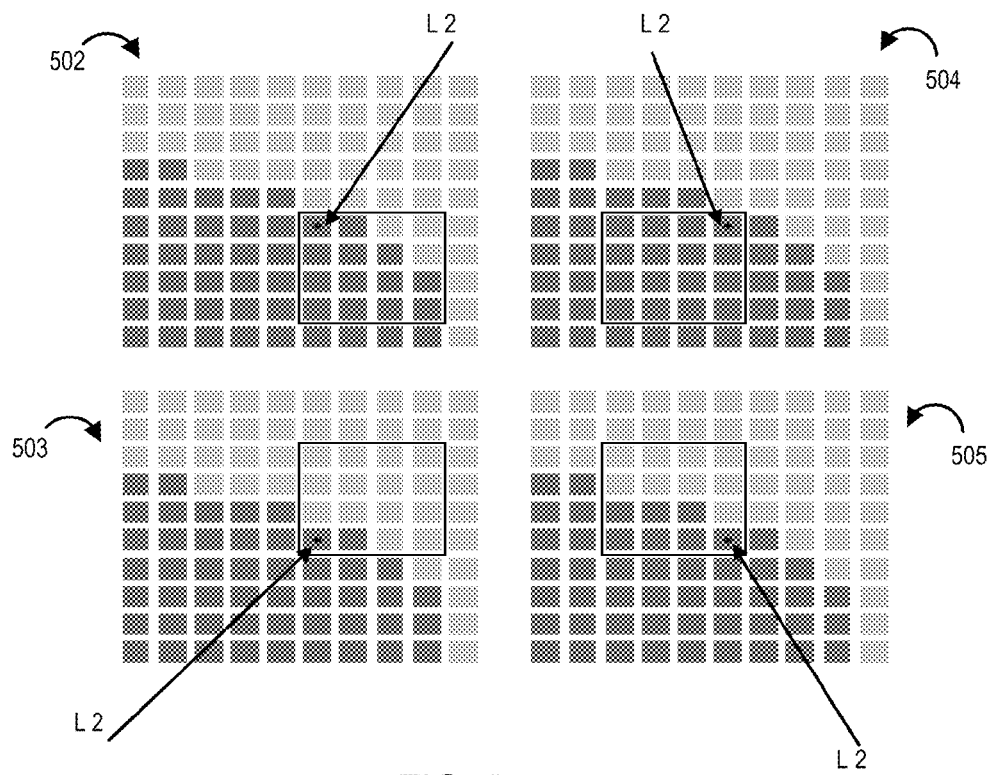

Second: consider a pixel with location L2 and value v on the dark side of the same edge in the sets of pixel values 502, 503, 504, 505 shown in FIG. 5. Note that the pixel values are the same as shown in FIG. 4 but the pixel value location L2 used to explain the filtering is different from the pixel value location L1. Provided the curvature of the edge is large compared to the neighborhood size N, at least one of the four neighborhoods with corners at L2 is entirely contained on the darker side of the edge; the minimum of the four maxima is therefore v. Thus on either side of the edge the quick-close operator yields a value equal to the original pixel value. This can be generalized to the following principle: if the pixel value is a monotone function of both x and y in a (2N+1)×(2N+1) square, then the quick-close operator yields a value for the pixel equal to the original value. Note that the quick-close operator also yields values equal to the original pixel values near the intersection of a vertical and horizontal edge.

Figure 6:
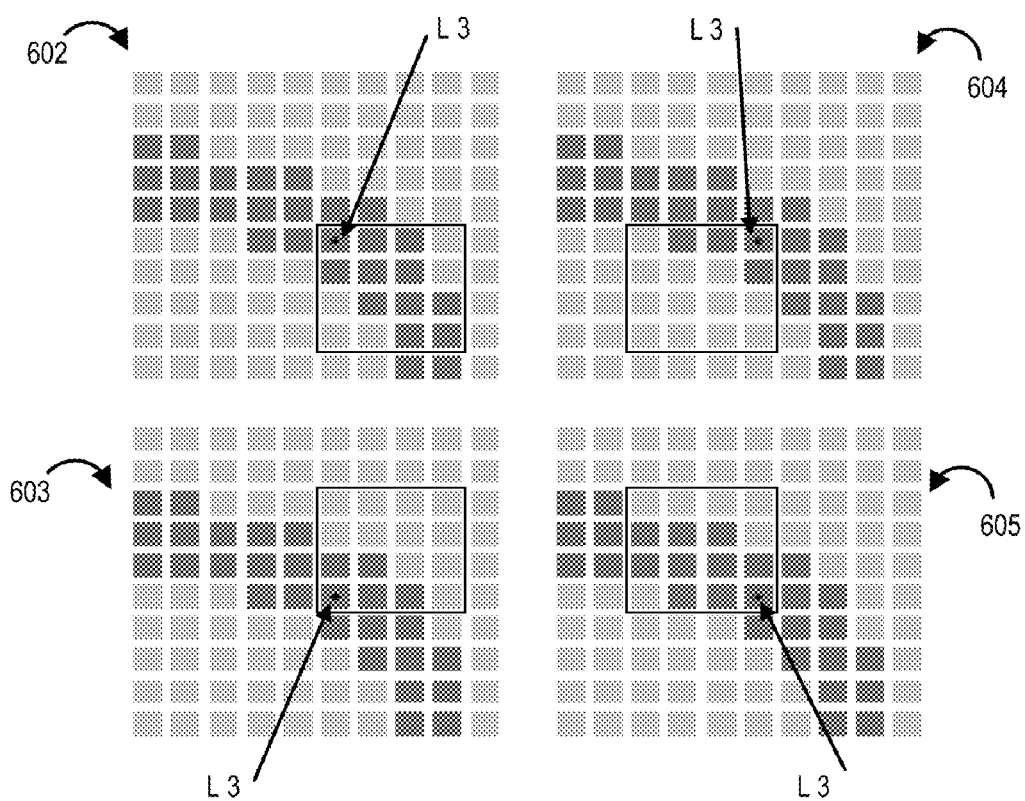

By contrast, consider a pixel with location L3 belonging to a dark foreground feature with gray-value v against a lighter background with gray-value V as shown in FIG. 6. Note that FIG. 6 shows the same set of pixel values four times 602, 603, 604, 605 with different figure neighborhoods shown around pixel value location L3 in each of each of the illustrations 602, 603, 604, 605. Provided the width of the feature, e.g., the dark region of pixels shown in FIG. 6, is less than the neighborhood size, each of the four neighborhoods with a corner at L3 contains some of the lighter background pixels. As a result the quick-close operator yields value V for the pixel at location L3 rather than the original value v. Thus the quick-close operator tends to erase narrow dark foreground features while preserving large-scale background features. This observation provides a guidance on the choice of the neighborhood size N which may be varied depending on the particular embodiment and/or image characteristics. In some embodiments N may be fixed, i.e., predetermined, but in other embodiments N may be selected based on the characteristics of the image being processed.

Figure 1:
FIG. 1 illustrates an exemplary gray scale image which can be subject to binarization.
Figure 2:
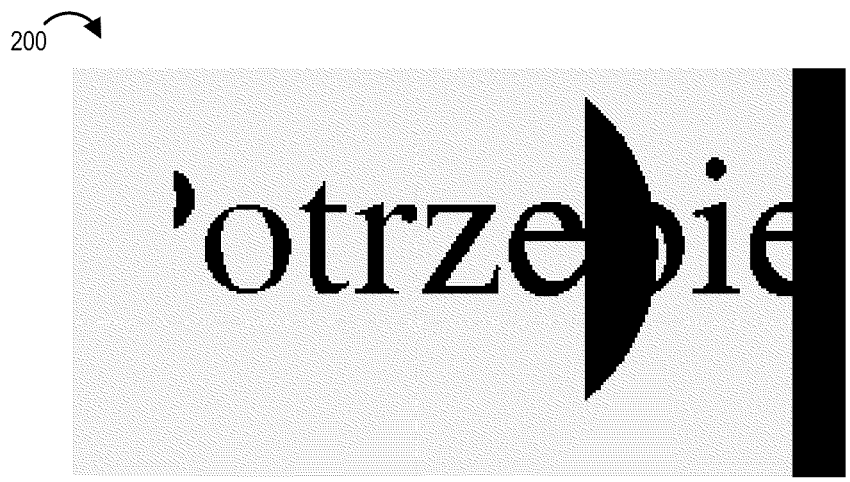
FIGS. 2 and 3 illustrate the results of using known thresholding techniques to perform binarization on the image of FIG. 1.

Note that the exemplary image shown in FIG. 1 includes two solid circular features which are darker than their surroundings. One is the large gray circle in the background while the other is the dot over the letter i. One can determine that one of these is a background feature and the other foreground on the basis of the scale of the features. Narrow features can be, and in some embodiments are, defined to be foreground while wider features are defined to be background. This works particularly well where the foreground content to be preserved includes text. The neighborhood size N should be defined to be modestly larger than the maximum stroke width of foreground features, e.g., 1-5 pixels larger. However, this is not a mandatory feature of the invention. In various examples included herein, including the example of the result of applying the quick-close operator to the image of FIG. 1, N is taken to equal 10.

Figure 7:
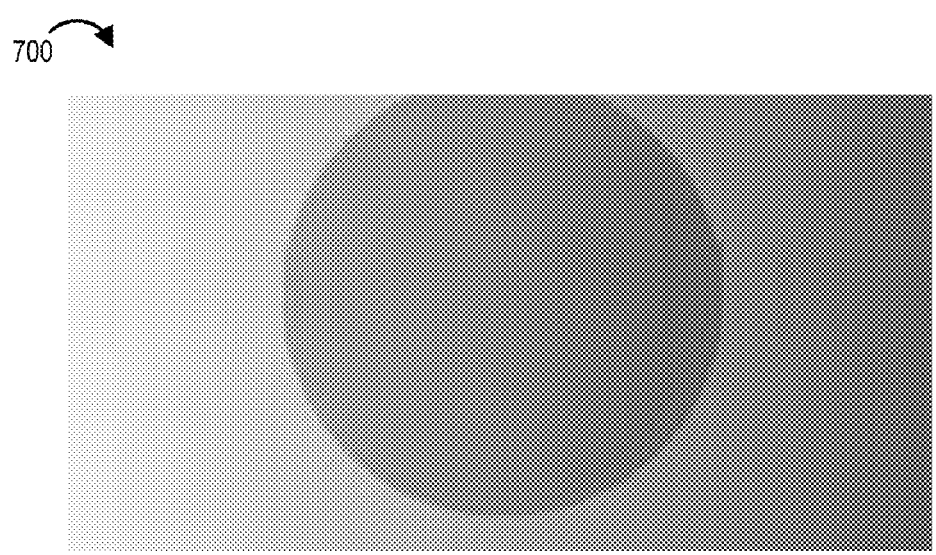
FIG. 7 shows an image 700 resulting from the quick-close operator being applied to the image of FIG. 1

FIG. 7 shows an image 700 resulting from the quick-close operator being applied to the image of FIG. 1. Note that small-scale foreground features are cleanly erased while large-scale background features are preserved.

In the case where all foreground features are darker than the background, the quick-close operator provides a rapid and effective binarization method: simply declare as foreground (black) all those pixels significantly darker than the output of the quick-close operator and declare as background (white) the remainder. However, a single image may contain foreground features both lighter and darker than the background, as in the image, e.g., a 304×217 sample image, shown in FIG. 8.

Figure 8:
FIG. 8 shows a sample image showing both light and dark foreground features against a background with both smooth and sharp large scale structures.

The image 800 shown in FIG. 8 is a sample image showing both light and dark foreground features against a background with both smooth and sharp large scale structures.

Figure 9:
FIG. 9 shows the result 900 of applying the quick-close operator applied to the image 800.

FIG. 9 shows the result 900 of applying the quick-close operator applied to the image 800. By comparing the image 900 and the original image 800, it can be seen that while dark foreground features are cleanly erased, light foreground features persist, following application of the quick-close operator, surrounded by something of a halo.

It should be appreciated that for many images application of a quick-close operator alone is insufficient for good binarization. In order to address the limitations of using the quick-close operator alone the exemplary method also uses a quick-open operator which can be considered to be complementary to the quick-close operator.

As discussed above, the value of resulting from application of the quick-open operator at a pixel location L is the maximum of the minimum values over the four N×N neighborhoods having a corner at location L.

Figure 10:
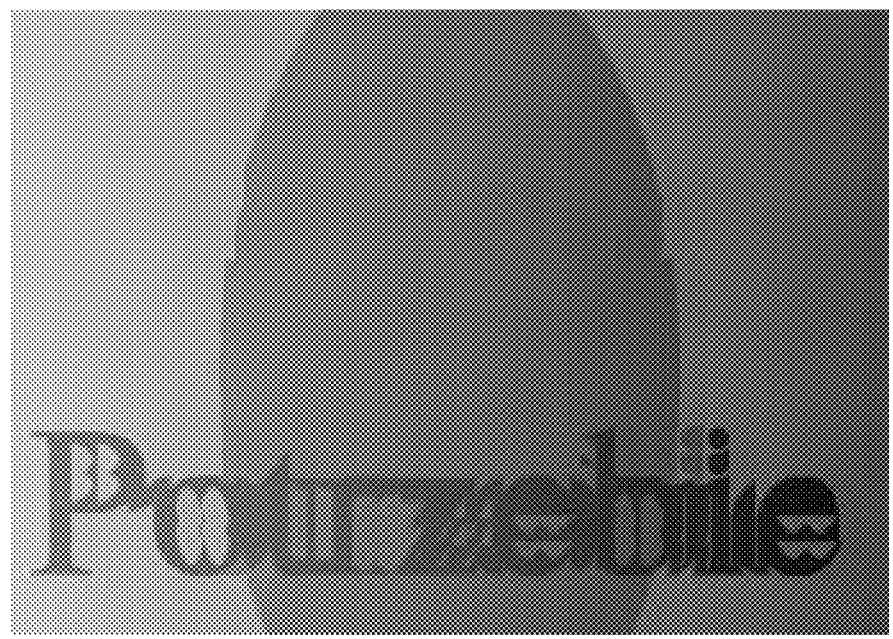
FIG. 10 shows the image 1000 resulting from application of the quick-open operator to the image 800 of FIG. 8.

FIG. 10 shows the image 1000 resulting from application of the quick-open operator to the image 800 of FIG. 8. Not surprisingly, it is seen in FIG. 10 that the quick-open operator cleanly erases light foreground features, while preserving and haloing dark foreground features.

Figure 11:
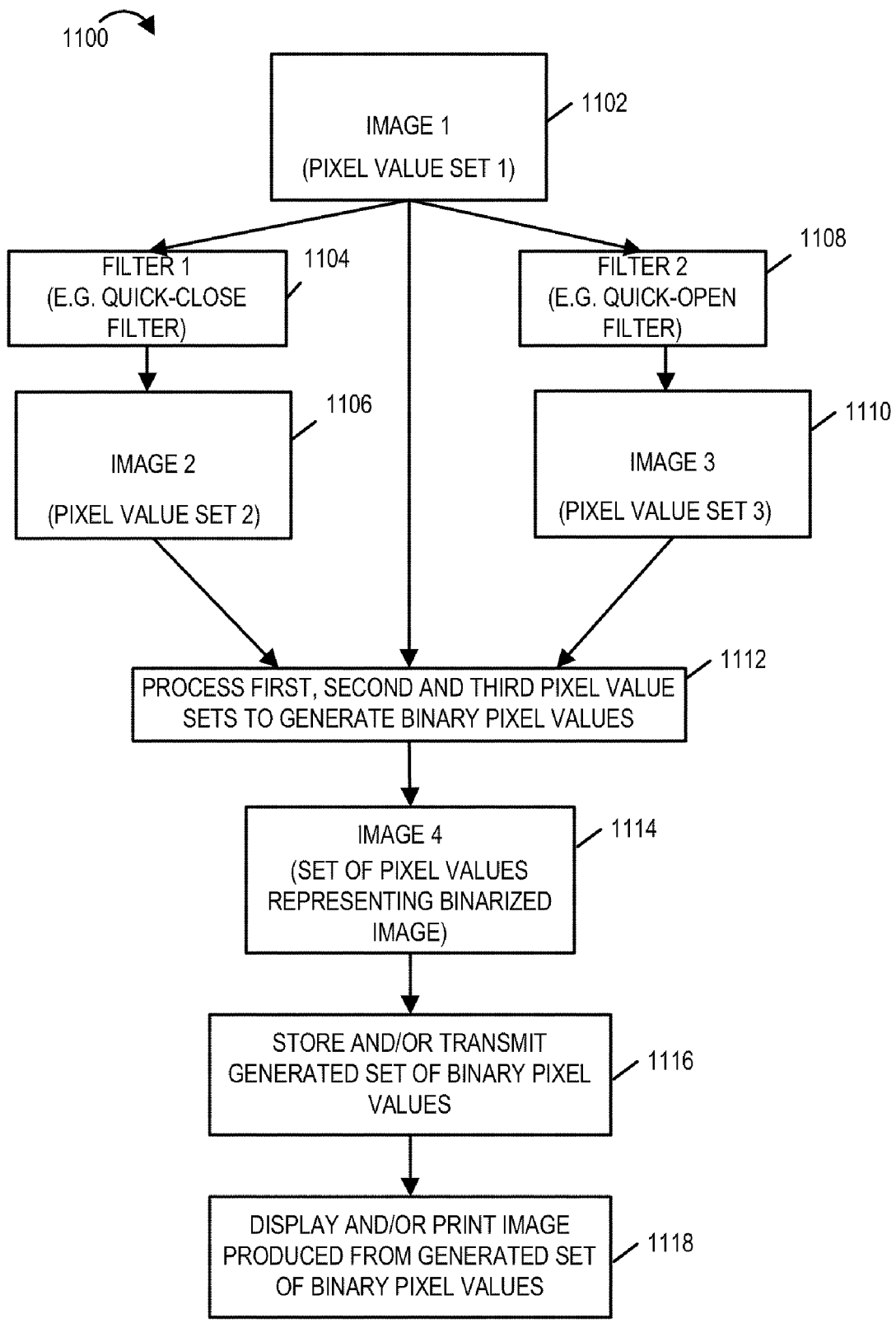
FIG. 11 is a flow chart showing the steps of a binarization method implemented in accordance with the invention.

An exemplary image binarization method 1100 of the present invention is shown in FIG. 11. The method may be implemented by a system such as the one shown in FIG. 15. A first set of pixel values 1102, e.g., multivalent pixel values which include more than two different pixel values, representing an image to be binarized (Image 1) is subjected to first and second filtering operations 1104, 1108 to produce second and third sets of pixel values 1106, 1110, respectively. In some embodiments the first filtering operation 1104 is a quick-close filtering operation and each pixel value in the second set of pixel values is not less than a corresponding pixel value in the first set of pixel values. For example, a pixel value in the second set of pixel values 1106 at pixel value location L1 in image 2 will not be less than the pixel value at image location L1 in image 1. In some embodiments, the second filtering operation 1108 is a quick-open filtering operation and each pixel value in the third set of pixel values 1110 is not more than a corresponding pixel value in the first set of pixel values 1102. Various methods for implementing processing step 1112 will be discussed in detail below.

In step 1112, the original input set of pixel values, second set of pixel values 1106 generated from the first filtering operation 1104 and the third set of pixel values 1110 generated from the second filtering operation 1108 are processed, in step 1112, to generate a set of binary pixel values 1114 representing the binary image (Image 4). Following generation of the set of pixel values 1114 representing the binary image, the generated set of pixel values are stored and/or transmitted to another device as shown in step 1116. The stored and/or transmitted set of pixel values 1114 may be, and in some embodiments is, displayed and/or printed in step 1118. The display of the binary image generated from the set of binary pixel values 1112 may be on a display device of a system implementing the method 1100 or on a display device of another system to which the generated set of pixel values is transmitted. The display of the generated image allows a user to view the resulting binary image, e.g., prior to using it as an input to additional processing. The image may represent black and white representation of a physical form or photo which was scanned to generate the input set of image pixel values 1102. The generated set of binary pixel values 1114 can be, and in some embodiments is, subjected to additional processing, e.g., optical character recognition operations as part of a form generation or processing application.

Figure 15:
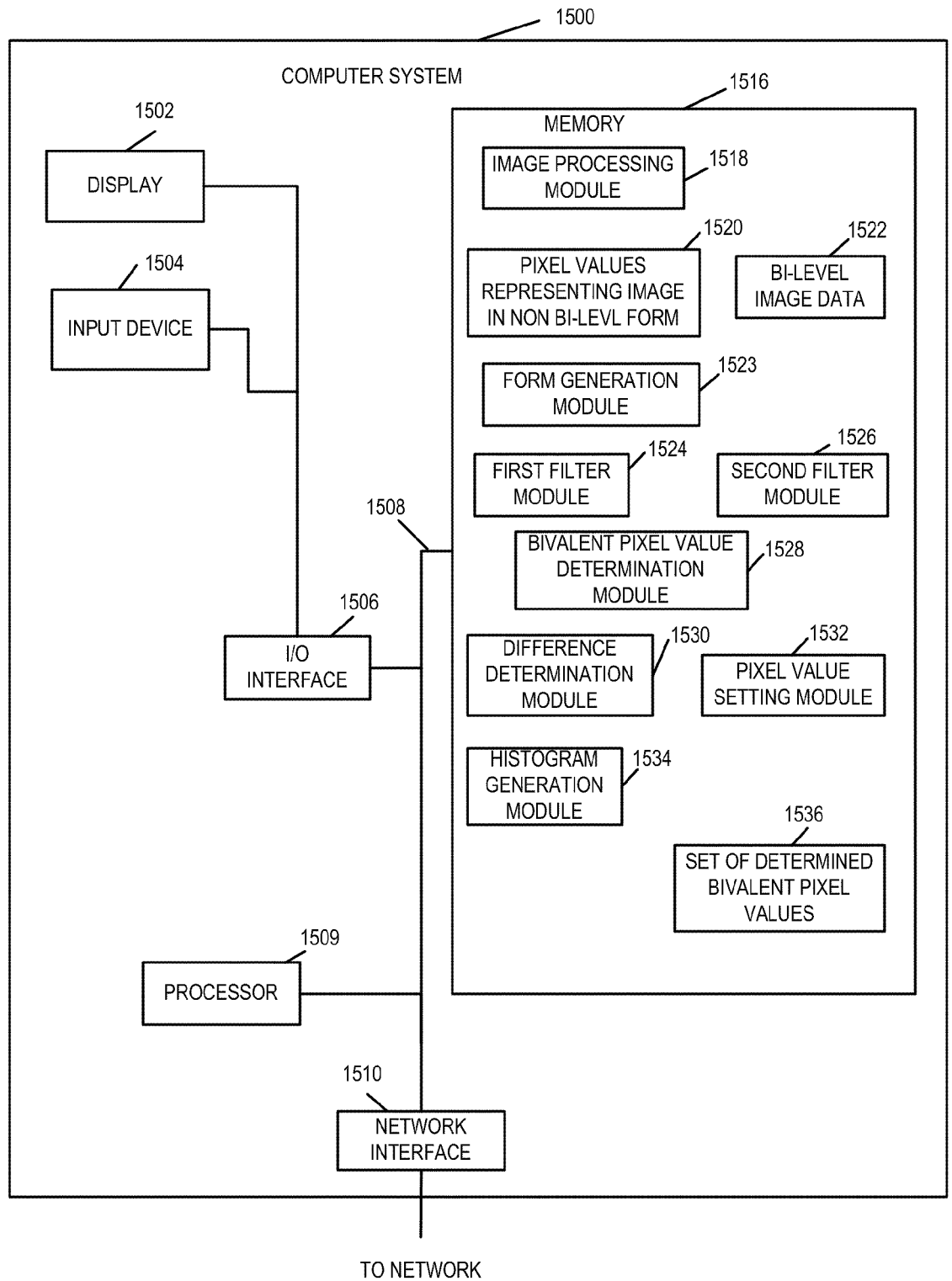
FIG. 15 shows a system for implementing the method of the present invention.

FIG. 11 shows the result of image processing at phase II of one exemplary binarization method which may be implemented in accordance with the present invention, e.g., by the system shown in FIG. 15.

The exemplary binarization method may include various phases. Phase I of the method involves the application of the quick-close and quick-open operators (steps 1104 and 1108) to a first set of pixel values 1103 representing an image to thereby produce first and second sets of filtered pixel values 1106, 1110.

Successive phases, e.g., Phases II, III and IV of one exemplary method correspond to step 1112 of the method shown in FIG. 11. The subsequent phases employ the information available in the three sets of pixel values, e.g., the first set of pixel values 1102 representing the input image 800, a second set of pixel values 1104 representing the image 1106 produced by the first filtering operation and the third set of pixel values 1110 produced by the second filtering operation to determine which pixel values in the image represent foreground and which background and thus which should be set to a foreground value, e.g., a value representing black, and which pixels should be set to a background value, e.g., a value representing white.

The manner in which phases II, III and IV are implemented may vary depending on the particular embodiment. In one exemplary embodiment, phase II includes setting certain easily-determined binary pixel values and collecting statistics on the pixel values generated by the quick-close and quick-open values included in the second and third sets of pixel values 1106 and 1110. Rather than collect and use quick-close and quick-open result statistics, pixel values which are not set in phase II to a foreground or background value may be set to a foreground or background value based on a local or global threshold however, the statistics-based approach used in some embodiments may produce better results than a local or global threshold approach for determining the pixel values which have not been determined by the end of Phase II.

In one particular embodiment, in Phase II and thereafter, the image, and corresponding pixel values, are partitioned into equal sized K×K blocks. Thus K-sized blocks become the unit used for Phases II, III and IV which are discussed below. K should be, and in some embodiments is, chosen to be larger than the neighborhood size N and in some embodiments significantly larger than N, e.g., two, three, four, or even ten times larger. Smaller values of K have the advantage that within a single block the pixel-value statistics are more uniform. It may be desirable not to make K so large that light and dark foreground features are found within the same block. In at least one exemplary embodiment, e.g., the example which results in the image 1400 shown in FIG. 14 from the image 800 shown in FIG. 8, K=30 while N=10.

In the particular exemplary embodiment, during Phase II, for each block K of pixel values an "ambihistogram" A is constructed, this is a type of histogram but includes both positive and negative entries. In the exemplary embodiment, the ambihistogram includes an entry for each gray-value from 0 to 255 (e.g., covering the range of possible multivalent pixel values). Each pixel location L within a block K is examined. Associated with L are the corresponding quick-open pixel value o from pixel-value set 1106, the original pixel-value v, and the corresponding quick-close value c from pixel-value set 1110. It can be shown that $o \leq v \leq c$.

If c−o is less than a certain fixed threshold θ, no further action is taken with respect to the location L in Phase II. This criterion excludes all background pixels not proximate to foreground features. The value of θ should, and in some embodiments is, chosen between the maximum level $\theta_0$ of noise in the image and the minimum contrast $\theta_1$ of foreground features to be isolated. If the level of noise exceeds the background/foreground contrast in the image, a preliminary noise filtering step may, and in some embodiments is, used. In the example which results in the production of the image 1400 shown in FIG. 14, θ=25. If c−o≧θ, then the ambihistogram entry corresponding to o is incremented and the entry corresponding to c is decremented. Also, c−v is compared with v−o to determine whether v is closer to c or o. If c−v<v−o, the output binary pixel at location L is set to the value of a background pixel value, e.g., colored white; otherwise it is set to a foreground pixel value, e.g., colored black.

Figure 12:
FIG. 12 shows an image 1200 resulting from Phase II processing of the exemplary binarization method in accordance with the invention.

FIG. 12 shows an image 1200 which is the result of Phase II, with some pixels colored black or white, and others which have not yet been set to black or which having yet to be determined. Certain noteworthy characteristics of the image guide the design of Phase III of the algorithm. Observe that foreground pixels, light or dark, as well as some background pixels, have been correctly binarized at the end of Phase II. Moreover, none of the pixels in the example have been incorrectly binarized.

In Phase III, it suffices to color the remaining unbinarized pixels of each localized block either uniformly white or uniformly black. This may be done using a threshold determined based on image statics. A variety of techniques may be used.

In one exemplary embodiment the choice of color to use for the pixels of a block which have not already been set to a foreground or background value is determined by comparing the particular block's remaining unbinarized gray-levels to the contents of its ambihistogram. A typical ambihistogram profile will include two or more peaks, one or more positive peaks at gray-levels found in the quick-open image, and one or more negative peaks at higher gray-levels found in the quick-close image. If the distribution of the remaining unbinarized gray-levels in the block of size K×K being processed more closely matches the positive peaks of the ambihistogram corresponding to the particular block being processed, the remaining pixels of the block should be set to a foreground color, e.g., colored black. If the distribution of the remaining unbinarized gray-levels more closely matches the negative peaks of the ambihistogram (though with opposite sign), the remaining pixels of the block should be set to a background color value, e.g., colored white.

In the particular exemplary embodiment used to generate the image 1400, in phase III a sum S is calculated for each K×K block. As part of generating the sum S for a block, for each unbinarized pixel location having a gray-value v, the ambihistogram value A[v] is added to S. If S>0 after examining all unbinarized pixels of the block, this indicates that the unbinarized gray-level distribution more closely matches the positive peaks of the ambihistogram, and all remaining pixels for the block are therefore colored black. If S≦0, this indicates that the distribution of remaining gray-levels more closely matches the negative peaks of the ambihistogram, and all remaining pixels for the particular block are therefore colored white. Coloring the remaining pixels white in the S=0 case causes those blocks consisting entirely of unbinarized pixels to be set to the foreground color, e.g., they are colored white.

FIG. 13 shows the result of Phase III. Note that in image 1300 the background has been colored white, except in proximity to the white foreground features, where a black background has been applied.

In some embodiments, e.g., in embodiments where each K×K block includes some unbinarized pixels at the end of Phase II, an additional Phase IV can be applied to reverse the gray-levels in those blocks whose unbinarized pixels were colored black in Phase III. The effect is to yield an image wherein all the background is colored white, and all the foreground is colored black, as shown in FIG. 14. Note that the image 1400 accurately captures the text from the input image 800 shown in FIG. 8 distinguishing between foreground and background even though a light foreground is used in the image 800 in some locations and a dark foreground in others.

As a review of the result shown in FIG. 14 reveals, the binarization method of the invention can provide good results. More significant, however, is that these results can be achieved using the methods of the invention in a manner which is considerably more efficient than the known ASF method.

FIG. 15 shows a system 1500 which can, and in various embodiments does, implement the methods of the present invention. The system 1500 is used for processing image data in accordance with the present invention. System 1500 includes a display device 1502, input device 1504, I/O interface 1506, processor 1509, a network interface 1510, and memory 1516. The display device 1502 may be used, e.g., to display images resulting from processing implemented in accordance with the present invention. Input device 1504 may be, e.g. a keyboard or other user input device. The display and input device are coupled to a bus 1508 by I/O interface 1506. The bus 1508 is also coupled to the memory 1516, processor 1509 and network interface 1510. The network interface 1510 couples the internal components of the system 1500 to an external network, e.g., the Internet, thereby allowing the system 1500 to receive and send image data over a network. The processor 1509 controls operation of the computer system 1500 under direction of software modules and/or routines stored in the memory 1516. Memory 1516 includes an image processing module 1518, pixel values 1520 representing an image in a non-bi-level form, e.g., a colored or grayscale image, and a bi-level representation of the image 1522, a form generation module 123, first filter module 1524, second filter module 1526, a bi valent pixel value determination module 1528, a difference determination module 1530, a pixel value setting module 1532, a histogram generation module 1534, a comparison module 1536, and a calculation module 1538.

The image processing module 1518 includes a software routine, e.g., machine executable instructions, for generating a bi-level image 1522 in accordance with the invention from a non-bi-level representation 1520 of the image. When executed by processor 1509, the image processing module 1518 controls the processor 1509 to convert at least some of the image data 1520 to a bi-level representation of the corresponding image portion in accordance with a method of the present invention. The resulting bi-level image data 1522 is stored in memory 1516 for future use and/or communicated to another device. The bi-level image data may be retrieved from storage, and displayed or printed. Alternatively it may be subjected for further processing, e.g., by form generation module 1523. In addition or alternatively the bi-level image data may be transmitted to another device for further processing and/or display.

In one exemplary embodiment the exemplary method of the present invention is used to process a first set of pixel values corresponding to a portion of an image, the first set of pixel values including multivalent pixel values, e.g., pixel values representing non bi level image, each multivalent pixel value corresponding to a pixel-value location in the portion of the image. Various modules in the memory 1516 will now be discussed in view of this embodiment.

The first filter module 1524 is for performing a first filtering operation on the first set of pixel values to generate a second set of pixel values, each pixel value in said second set of pixel values being not less than a corresponding pixel value in the first set. Thus the second set of pixel values is generated as a result of filtering operation on the first set of pixel values. In some embodiments the first filtering operation removes dark image features narrower than a first predetermined width. In some embodiments the first filter module is a quick-close filter.

The second filter module 1526 is for performing a second filtering operation on the first set of pixel values to generate a third set of pixel values, each pixel value in the third set of pixel values being not more than a corresponding pixel value in the first set. In some embodiments the second filtering operation removes light image features narrower than a second predetermined width. In some embodiments the second filter module is a quick-open filter. The bivalent pixel value determination module 1528 is for determining a bivalent pixel value, for each of a plurality of pixel value locations in the portion of the image, based on the corresponding pixel values in at least two of the first, second and third sets of pixel values. The stored set of determined bivalent pixel values corresponding to the portion of an image 1536 is an output of the determination module 1528.

The difference determination module 1530 is for determining, on an individual per pixel value location basis, if the difference between the pixel values in the second and third sets of pixel values, corresponding to said individual pixel value location, exceeds a threshold. The threshold level can be predetermined in some embodiments. Thus the difference determination module 1530 compares the difference between the pixel values in the second and third sets of pixel values, on an individual per pixel value location basis, with a threshold to determine if the difference exceeds the threshold level.

The pixel value setting module 1532 is for setting the pixel value for said pixel value location based on a comparison of the size of the difference between the pixel value for the corresponding pixel location in the first and second sets relative to the size of the difference between the pixel values for the corresponding location in the first and third sets. In some embodiments the pixel value setting module 1532 is configured to set the pixel value for the pixel value locations in the following manner:

if $|P_{1L}-P_{2L}|<|P_{1L}-P_{3L}|$ set $P_{4L}$ to a background pixel.

if $|P_{1L}-P_{2L}|>|P_{1L}-P_{3L}|$ set $P_{4L}$ to a foreground pixel value.

where $P_{1L}$ is the pixel value P corresponding to pixel value location L in the first set of pixel values, $P_{2L}$ is the pixel value P corresponding to pixel value location L in the second set of pixel values, where $P_{3L}$ is the pixel value P corresponding to pixel value location L in the third set of pixel values, and $P_{4L}$ is the pixel value P corresponding to pixel value location L in the set of determined binary pixel values.

The histogram generation module 1534 is configured to generate a histogram from the pixel values in said second and thirds sets of pixel values for at least one rectangular image region where pixel values for all the pixel value locations in the region have not been by said setting module 1532, the histogram generation module 1534 being configured to generate the histogram from pixel values corresponding to locations for which a pixel value was set by said setting module 1532. The generation the histogram of pixel values in accordance with the invention will become clearer in view of the example discussed later. The bivalent pixel value determination module 1528 is further configured to determine, as a function of the generated histogram, whether to set the pixel values in said image region which have not been set, to a foreground value or a background value. In some embodiments the determination operation performed by module 1528 as a function of the generated histogram, includes determining, based on the generated histogram and based on pixel values corresponding to said image region in said first set of pixel values, if the majority of the undetermined pixel values are likely to be foreground or background pixel values.

The pixel value setting module 1532 is further configured to set all undetermined pixel values corresponding to said image region, e.g., which have not been earlier and for which pixel values remain undetermined, to the determined one of the foreground or background value. Thus in this manner the remaining pixel values are set to one of the foreground or background value.

Figure 16A:
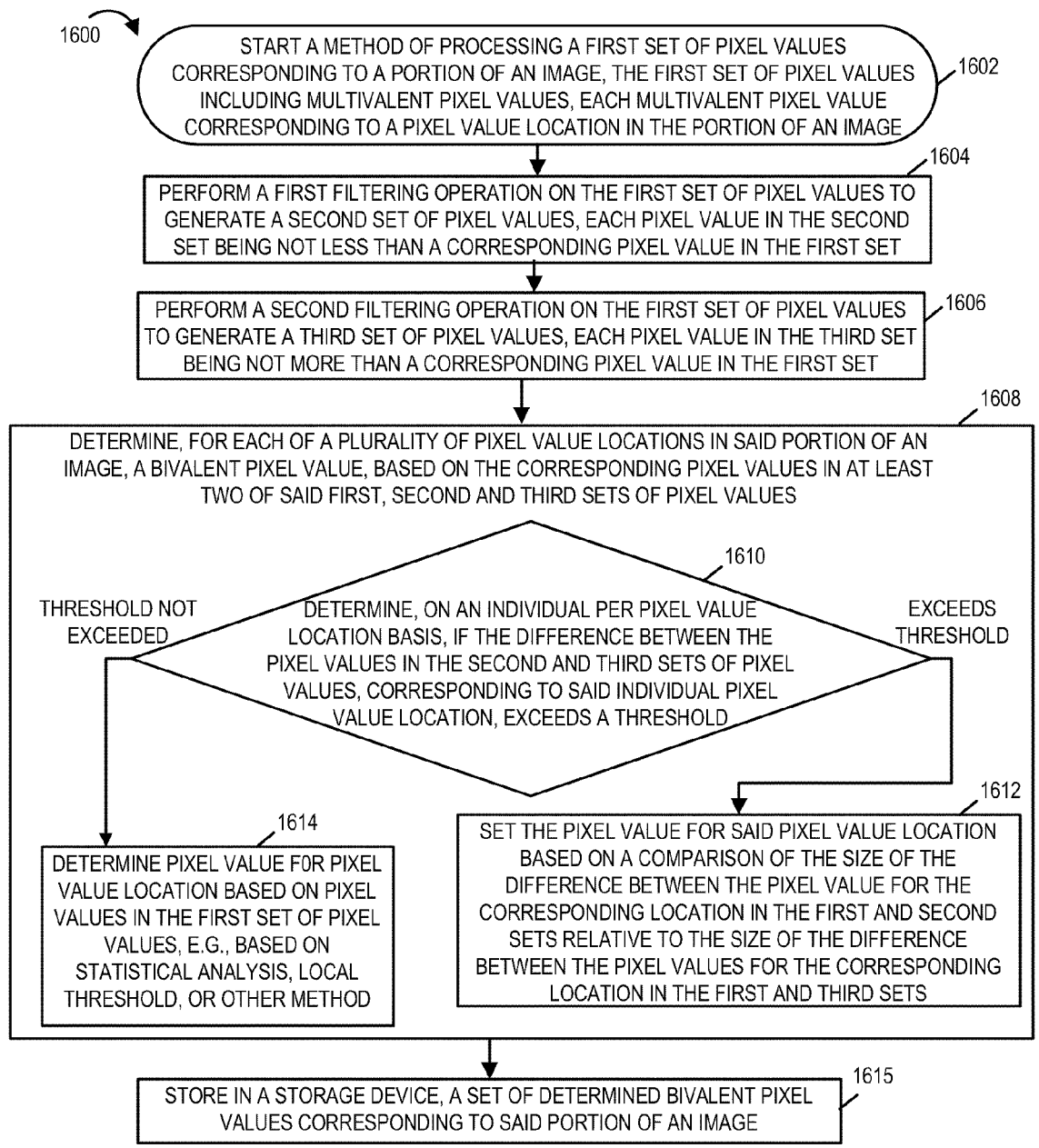
FIG. 16A is a detailed flow chart showing the steps of one exemplary method implemented in accordance with the invention.

FIG. 16A is a detailed flow chart 1600 showing the steps of one exemplary method of processing a first set of pixel values corresponding to a portion of an image, implemented in accordance with the invention. The first set of pixel values including multivalent pixel values, each multivalent pixel value corresponding to a pixel-value location in the portion of an image. The steps of the exemplary method can be implemented by the system 1500 of FIG. 15. Various steps will become more clear when considered in view of FIGS. 17-27 showing sets of pixel values which relate the exemplary method of flowchart 1600. The exemplary method starts in step 1602 where the system implementing the method is initialized.

Operation proceeds from the start step 1602 to step 1604. In step 1604 a first filtering operation is performed on the first set of pixel values to generate a second set of pixel values, each pixel value in the second set of pixel values being not less than a corresponding pixel value in the first set. Exemplary first and second set of pixel values are shown in FIGS. 17-18 and will be discussed later in detail.

Operation proceeds from step 1604 to step 1606. In step 1606 a second filtering operation is performed on the first set of pixel values to generate a third set of pixel values, each pixel value in said third set of pixel values being not more than a corresponding pixel value in the first set. An exemplary third set of pixel values generated as a result of the second filtering operation performed on the first set of pixel values is shown in FIG. 19. The operation proceeds from step 1606 to step 1608. In step 1608 a bivalent pixel value, for each of a plurality of pixel value locations in the portion of an image is determined based on the corresponding pixel values in at least two of said first, second and third sets of pixel values. A determined bivalent pixel value in some embodiments is either background or foreground. The determination of the bivalent pixel values is performed by the bivalent pixel value determination module 1528 of FIG. 15. The determination step 1608 includes step 1610 where it is determined on an individual per pixel value location basis, if the difference between the pixel values in the second and third sets of pixel values, corresponding to said individual pixel value location, exceeds a threshold. Thus the difference between the pixel values in the second and third sets of pixel values corresponding to the individual pixel value locations in compared to a threshold to determine if the difference is below the threshold level or if it exceeds the threshold.

If it is determined that the difference between the pixel values in the second and third sets of pixel values corresponding to said pixel value location exceeds the threshold, operation proceeds from step 1610 to step 1612. In step 1612, the pixel value for said pixel value location is set based on a comparison of the size of the difference between the pixel value for the corresponding pixel location in the first and second sets relative to the size of the difference between the pixel values for the corresponding location in the first and third sets. In some embodiments setting the pixel value for said pixel value locations based on a comparison of the size of the difference is performed in accordance with the equation:

if $|P_{1L}-P_{2L}|<|P_{1L}-P_{3L}|$ set $P_{4L}$ to a background pixel value (e.g., white in one exemplary embodiment);

if $|P_{1L}-P_{2L}|>|P_{1L}-P_{3L}|$ set $P_{4L}$ to a foreground pixel value (e.g., black pixel value in the exemplary embodiment);

where $P_{1L}$ is the pixel value P corresponding to pixel value location L in the first set of pixel values;

where $P_{2L}$ is the pixel value P corresponding to pixel value location L in the second set of pixel values;

where $P_{3L}$ is the pixel value P corresponding to pixel value location L in the third set of pixel values; and where $P_{4L}$ is the pixel value P corresponding to pixel value location L in the set of determined binary pixel values.

If it is determined that the difference between the pixel values in the second and third sets of pixel values corresponding to said pixel value location does not exceed the threshold, operation proceeds from step 1610 to step 1614 wherein the pixel value for said pixel value location is determined based on the pixel values in the first set of pixel values, e.g., based on statistical analysis, local threshold or other method.

Operation proceeds from step 1608 to step 1615. In step 1615 a set of determined bivalent pixel values, e.g., a set including a bivalent pixel value for each of the plurality of pixel value locations in said portion of the image determined in 1608, corresponding to said portion of the image is stored in a storage device, e.g., memory 1516.

Figure 16B:
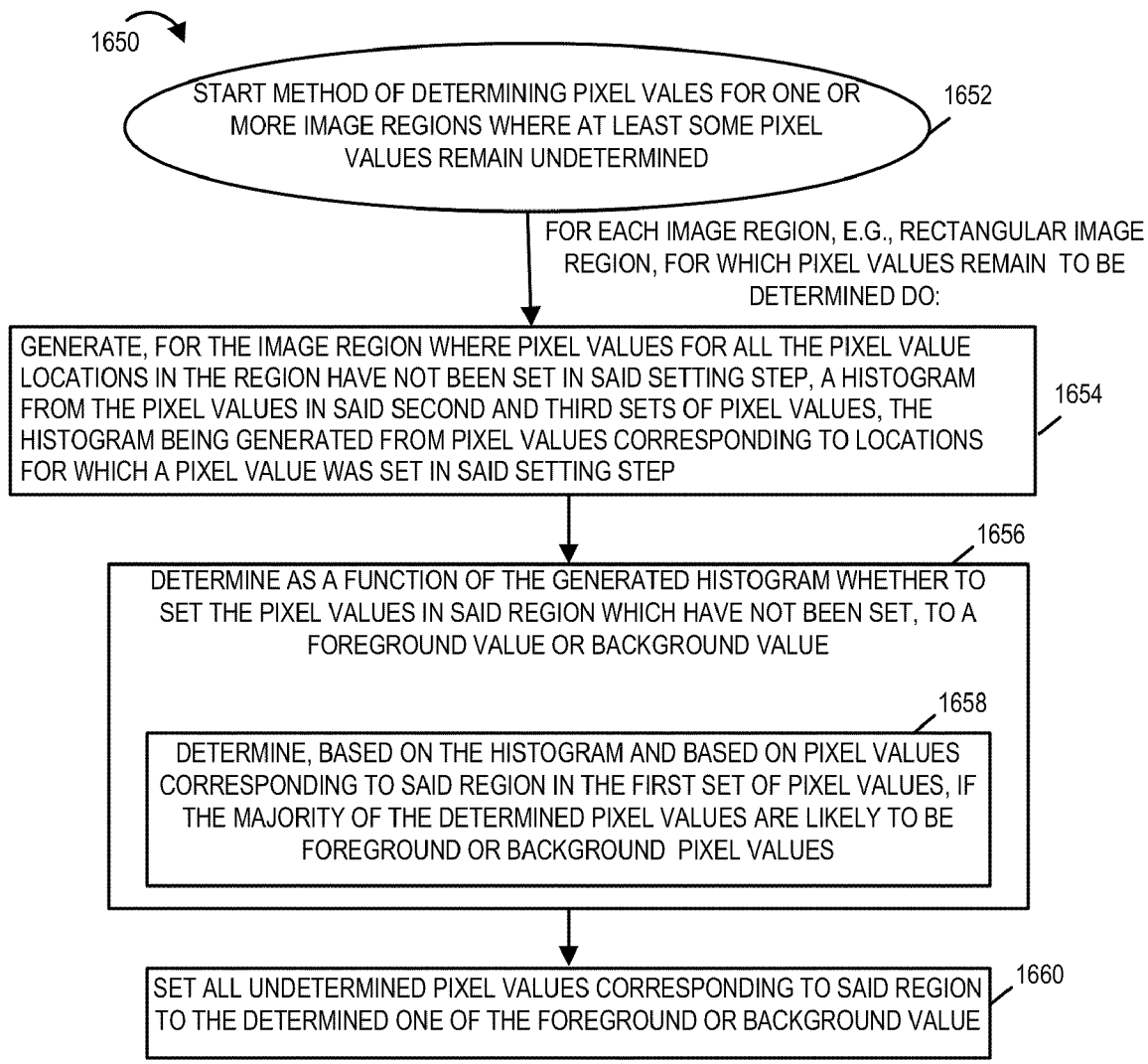
FIG. 16B is a flowchart illustrating the steps of one exemplary method of determining previously undetermined pixel values.

FIG. 16B is a flowchart 1650 illustrating the steps of one exemplary method of determining previously undetermined pixel values. The method 1650 may be used to implement step 1614 shown in FIG. 16A. The exemplary method starts in step 1652. In accordance with the method, for each image region, e.g., rectangular image region, for which pixel values remain to be determined, steps 1654 to 1660 are performed. It should be appreciated that an image may be treated as a single region but, in some embodiments a region size larger than the size of the quick-close and quick-open filter widths, e.g., in terms of pixels, is selected. In this manner, an image may, and in some embodiments is divided into multiple regions for purposes of determining whether to set the undetermined pixel values in the region to a foreground or background value. In some embodiments image regions for which histograms are generated are at least three times larger than the size of an image region used by either of said first and second filters to determine a pixel value in one of said second and third sets of pixel values. Once a decision is made whether the undetermined pixel values should be set to a foreground or a background value, at least in some embodiments, all the undetermined pixel values in the region are set to the determined foreground or background value.

Figure 23:
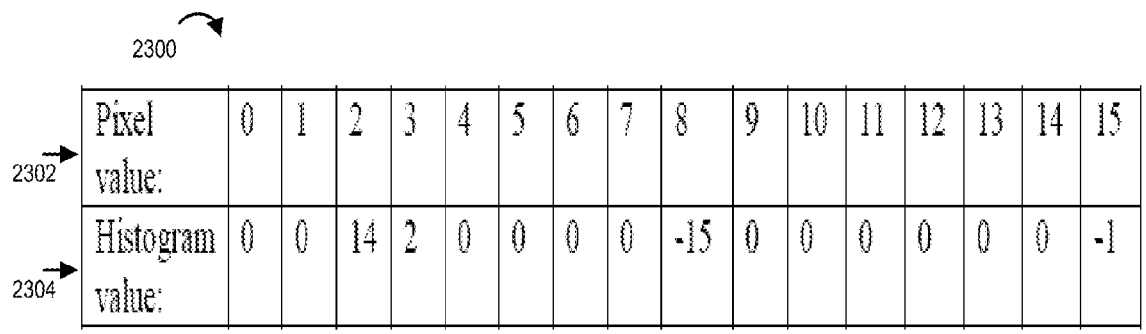

Operation proceeds from the start step 1652 to step 1654. In step 1654 a histogram is generated from the pixel values in said second and thirds sets of pixel values, for the image region where pixel values for all the pixel value locations in the region have not been set in the setting step 1612. The histogram is generated from pixel values corresponding to locations for which a pixel value was set in said setting step 1612. The histogram shown in FIG. 23 is an example of a histogram which may be generated in step 1654. Operation proceeds from step 1654 to step 1656.

In step 1656 it is determined, as a function of the generated histogram, whether to set the pixel values in said image region which have not been set, to a foreground value or a background value. Thus a determination regarding the pixel values for pixel value locations in said image region which still have not been set in the setting step 1612 is made, so that such pixel values can be set to a foreground value or a background. The determination step 1656 in some embodiments includes performing step 1658 wherein it is determined, based on the generated histogram and based on pixel values corresponding to said region in said first set of pixel values, if the majority of the undetermined pixel values are likely to be foreground or background pixel values.

Operation proceeds from step 1656 to step 1660. In step 1660 all undetermined pixel values corresponding to said image region which have not been, to the determined one of the foreground or background value. See for example FIG. 27 which shows the final image which includes the previously set pixel values and the pixel values which are set in step 1660.

To facilitate better understanding of the described invention, consider an example where an exemplary method of the present invention has been used for processing pixel values corresponding to an image region. The following example will be discussed with reference to FIGS. 17-27. In accordance with one aspect, a quick-close and quick-open filtering operation is performed on a set of pixel values corresponding to an image region. In the following example, the region size used for the quick-close and quick-open filters is 2×2, whereas the region size used to calculate histograms is 10×10. In the discussed example pixel values are assumed to range from 0 to 15.

FIG. 17 shows a first set of pixel values 1700 corresponding to a region of the original image.

FIG. 18 shows a second set of pixel values 1800 produced as a result of performing a first filtering operation on the first set of pixel values shown in FIG. 17. Thus, the second set of pixel values represents the pixel values corresponding to the first filtered image generated as a result of the quick-close filtering operation performed on the original image. Each pixel value in the second set of pixel values is not less than a corresponding pixel value in the first set of pixel values.

FIG. 19 shows a third set of pixel values 1900 produced as a result of performing a second filtering operation on the first set of pixel values shown in FIG. 17. The third set of pixel values represents the pixel values corresponding to the second filtered image generated as a result of the quick-open filtering operation performed on the original image. Each pixel value in the third set of pixel values 1900 is not more than a corresponding pixel value in the first set 1700.

FIG. 20 shows another set of pixel values 2000. The set of pixel values 2000 shown in FIG. 20 represents the difference between the individual pixel values in the second set and the third set of pixel value which represents, e.g., the difference between first and second filtered images.

In accordance with the invention, it is determined, on an individual per pixel value location basis, if the difference between the pixel values in the second 1800 and third 1900 sets of pixel values, corresponding to the individual pixel value location, exceeds a threshold. FIG. 21 shows a grid 2100 of pixel value locations corresponding to individual pixel values. Locations where the difference in individual pixel values between the second set and the third set exceeds a threshold value are indicated by an asterisk symbol as can be seen in FIG. 21.

FIG. 22 shows a fourth set of pixel values 2200 which is generated in accordance with one aspect. When it is determined that the threshold is exceeded, the pixel value for each pixel value location is set based on a comparison of the size of the difference between the pixel value for the corresponding pixel location in the first and second sets relative to the size of the difference between the pixel values for the corresponding location in the first and third sets of pixel values. In at least some embodiments setting the pixel values for the individual pixel value locations (where threshold is exceeded) based on a comparison of the size of the difference is performed in accordance with the equation:

if $|P_{1L}-P_{2L}|<|P_{1L}-P_{3L}|$ set $P_{4L}$ to a background pixel value,
if $|P_{1L}-P_{2L}|>|P_{1L}-P_{3L}|$ set $P_{4L}$ to a foreground pixel value,
where $P_{1L}$ is the pixel value P corresponding to pixel value location L in the first set of pixel values, where $P_{2L}$ is the pixel value P corresponding to pixel value location L in the second set of pixel values, where $P_{3L}$ is the pixel value P corresponding to pixel value location L in the third set of pixel values, and where $P_{4L}$ is the pixel value P corresponding to pixel value location L in the set of determined binary pixel values.

Figure 3:
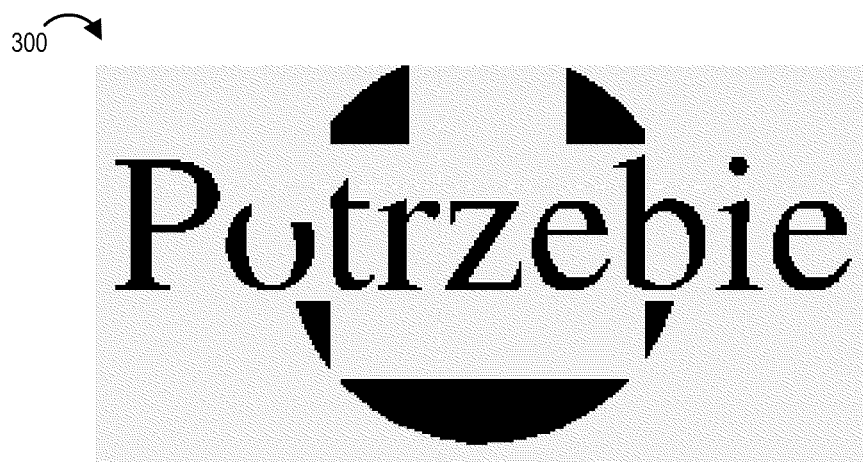

FIG. 23 illustrates a table 2300 in which the first row 2302 represents pixel values which range from 0 to 15 as discussed earlier. The second row 2304 represents the histogram values corresponding to the pixel value in the corresponding column. The way in which the histogram values are generated is as follows: First, for the pixel value locations identified in FIG. 21, a first histogram is generated for corresponding pixel values at the identified location in FIG. 18. Then for the pixel value locations identified in FIG. 21, a second histogram is generated for the corresponding pixel values at the identified locations in FIG. 19. Finally the histogram values corresponding to each individual pixel value in the first histogram is subtracted from the histogram values corresponding to each individual pixel value in the second histogram. For example, the histogram value corresponding to pixel value 8 in FIG. 23 is set to be "−15". In accordance with the above explanation this value of "−15" is calculated in the following way: Out of the 17 identified pixel value locations shown in FIG. 21, 16 have the pixel value=8 in FIG. 18 and thus the histogram value of "16" is set corresponding to pixel value 8 in FIG. 24 which shows the first histogram. Out of the 17 identified pixel value locations shown in FIG. 5, only 1 has the pixel value=8 in FIG. 3 and thus the histogram value of "1" is set corresponding to pixel value 8 in FIG. 25 which shows the second histogram. Now when the histogram value corresponding to pixel value "8" in the first histogram is subtracted from the histogram value corresponding to pixel value "8" in the second histogram, we have 1−16=−15. Remaining histogram values in row 2304 are also calculated in a similar manner as the histogram value corresponding to pixel value "8" has been calculated.

The pixel-value locations that were identified in FIG. 21 were set to either background (B) or Foreground (F) pixel value in FIG. 22. For the remaining unclassified pixel value locations in FIG. 22 which have not been set, a third histogram is generated for the corresponding pixel values in FIG. 22. This is illustrated in FIG. 26 which shows a table 2600 in which the first row 2602 represents pixel values and the second row 2604 represents the histogram values (shown as Number remaining) corresponding to the pixel values corresponding to the remaining unclassified pixel value locations in the corresponding columns.

FIG. 27 illustrates the result 2700 of processing the image where all the pixel values have been set to either background or foreground in accordance with the invention. To obtain the result shown in FIG. 27, the pixel values which remain unclassified in FIG. 22 are set based on a calculated indicator value. The sign of the indicator value, e.g., positive or negative, indicates whether the remaining pixel values should be set as background or foreground.

Figure 24:
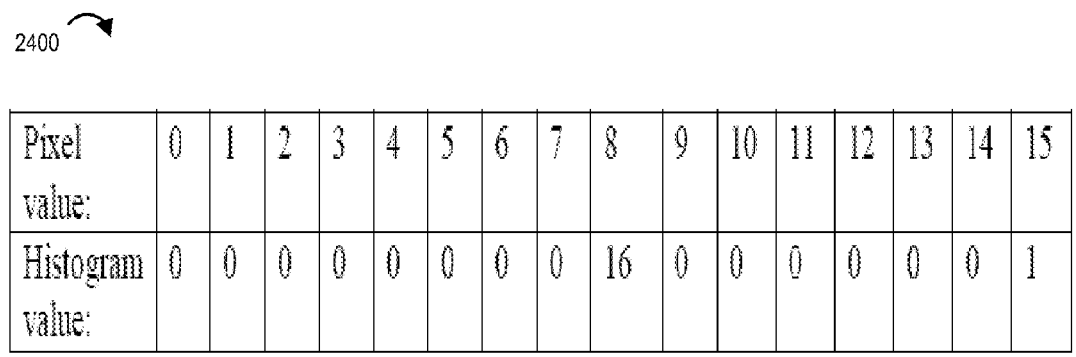
Figure 25:
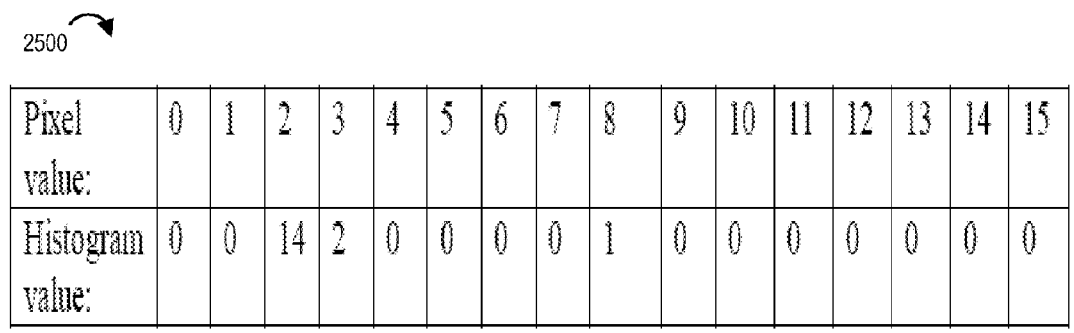

The indicator value is calculated by performing a combining operation on the histogram values in FIGS. 23 and 24. The combining operation is performed in the following manner: Individual values are obtained by independently multiplying each histogram value corresponding to a pixel value in table 2300 with a corresponding histogram value corresponding to the same pixel value in table 2400. Following this, all the obtained individual values are added. The exemplary combining operation performed using the histogram values in FIGS. 23 and 24 to calculate the indicator value is shown below:

$$\begin{aligned}\text{Indicator Value} = &\ 0\times0 + 0\times0 + 14\times5 + 2\times1 +\\ &\ 0\times0 + 0\times0 + 0\times0 + 0\times0 +\\ &\ (-15)\times73 + 0\times3 + 0\times1 +\\ &\ 0\times0 + 0\times0 + 0\times0 + 0\times0 + (-1)\times0\\ = &\ 70 + 2 - 1095 = -1023\end{aligned}$$

Now in accordance with one aspect of the invention, since the indicator value is negative, the remaining unclassified pixel values of FIG. 22 are set to BACKGROUND, and thus image processing result shown in FIG. 27 is obtained. In cases where the calculated indicator value is positive, the remaining unclassified pixel values are set to FOREGROUND.

Some embodiments are directed toward a computer-readable medium embodying a set of software instructions, e.g., computer-executable instructions, for controlling a computer or other device to encode and compresses stereoscopic video. Other embodiments are directed toward a computer-readable medium embodying a set of software instructions, e.g., computer-executable instructions, for controlling a computer or other device to decode and decompress video on the player end. While encoding and compression are mentioned as possible separate operations, it should be appreciated that encoding may be used to perform compression and thus encoding may, in some cases, include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine-, e.g., computer-, readable medium, e.g., ROM, RAM, CDs, hard discs, etc., which include machine-readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general-purpose processor. Such embodiments remain within the scope of the present invention. Many of the above described methods or method steps can be implemented using machine-executable instructions, such as software, included in a machine-readable medium such as a memory device, e.g., RAM, floppy disk, etc. to control a machine, e.g., general-purpose computer with or without additional hardware, to implement all or portions of the above-described methods. Accordingly, among other things, the present invention is directed to a machine-readable medium including machine-executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of processing a first set of pixel values corresponding to a portion of an image, the first set of pixel values including multivalent pixel values, each multivalent pixel value corresponding to a pixel-value location in the portion of an image, the method comprising:
   performing a first filtering operation on said first set of pixel values to generate a second set of pixel values, each pixel value in said second set of pixel values being not less than a corresponding pixel value in the first set;
   performing a second filtering operation on said first set of pixel values to generate a third set of pixel values, each pixel value in said third set of pixel values being not more than a corresponding pixel value in the first set;
   using a processor to determine, for each of a plurality of pixel value locations in said portion of an image, a bivalent pixel value, based on the corresponding pixel values in at least two of said first, second and third sets of pixel values; and
   storing in a storage device, a set of determined bivalent pixel values corresponding to said portion of an image.

2. The method of claim 1, wherein said determining includes:
   determining, on an individual per pixel value location basis, if the difference between the pixel values in the second and third sets of pixel values, corresponding to said individual pixel value location, exceeds a threshold; and
   if it is determined that the threshold is exceeded, setting the pixel value for said pixel value location based on a comparison of the size of the difference between the pixel value for the corresponding pixel location in the first and second sets relative to the size of the difference between the pixel values for the corresponding location in the first and third sets.

3. The method of claim 2, wherein said setting the pixel value for said pixel value locations based on a comparison of the size of the difference is performed in accordance with the equation:
   if $|P_{1L}-P_{2L}|<|P_{1L}-P_{3L}|$ set $P_{4L}$ to a background pixel value;
   if $|P_{1L}-P_{2L}|>|P_{1L}-P_{3L}|$ set $P_{4L}$ to a foreground pixel value;
   where $P_{1L}$ is the pixel value P corresponding to pixel value location L in the first set of pixel values;
   where $P_{2L}$ is the pixel value P corresponding to pixel value location L in the second set of pixel values;
   where $P_{3L}$ is the pixel value P corresponding to pixel value location L in the third set of pixel values; and
   where $P_{4L}$ is the pixel value P corresponding to pixel value location L in the set of determined binary pixel values.

4. The method of claim 2, wherein said first filtering operation removes dark image features narrower than a width of a first filter used by said first filtering operation to generate said second set of pixel values.

5. The method of claim 4, wherein said first filter is a quick-close filter.

6. The method of claim 4, wherein said second filtering operation removes light image features narrower than a width of a second filter used by said second filtering operation to generate said third set of pixel values.

7. The method of claim 6, wherein said second filter is a quick-open filter.

8. The method of claim 2, further comprising:
   for at least one rectangular image region where pixel values for all the pixel value locations in the region have not been set in said setting step, generating a histogram from the pixel values in said second and thirds sets of pixel values, the histogram being generated from pixel values corresponding to locations for which a pixel value was set in said setting step; and
   determining, as a function of the generated histogram, whether to set the pixel values in said region which have not been set, to a foreground value or a background value.

9. The method of claim 8, wherein said determining, as a function of the generated histogram, includes determining, based on the histogram and based on pixel values corresponding to said region in said first set of pixel values, if the majority of the undetermined pixel values are likely to be foreground or background pixel values.

10. The method of claim 9, further comprising:
    setting all undetermined pixel values corresponding to said region to the determined one of the foreground or background value.

11. The method of claim 9, wherein image regions for which histograms are generated are at least three times larger than the size of an image region used by either of said first and second filters to determine a pixel value in one of said second and third sets of pixel values.

12. An apparatus for processing a first set of pixel values corresponding to a portion of an image, the first set of pixel values including multivalent pixel values, each multivalent pixel value corresponding to a pixel value location in the portion of an image, the apparatus comprising:
    first filter means for performing a first filtering operation on said first set of pixel values to generate a second set of pixel values, each pixel value in said second set of pixel values being not less than a corresponding pixel value in the first set;
    second filter means for performing a second filtering operation on said first set of pixel values to generate a third set of pixel values, each pixel value in said third set of pixel values being not more than a corresponding pixel value in the first set;
    means for determining, for each of a plurality of pixel value locations in said portion of an image, a bivalent pixel value, based on the corresponding pixel values in at least two of said first, second and third sets of pixel values; and
    means for storing a set of determined bivalent pixel values corresponding to said portion of an image.

13. The apparatus of claim 12, further comprising:
    determination means for determining, on an individual per pixel value location basis, if the difference between the pixel values in the second and third sets of pixel values, corresponding to said individual pixel value location, exceeds a threshold; and means for setting, if it is determined that the threshold is exceeded, the pixel value for said pixel value location based on a comparison of the size of the difference between the pixel value for the corresponding pixel location in the first and second sets relative to the size of the difference between the pixel values for the corresponding location in the first and third sets.

14. The apparatus of claim 13, wherein said means for setting sets the pixel value for said pixel value locations in accordance with the equation:

if $|P_{1L}-P_{2L}|<|P_{1L}-P_{3L}|$ set $P_{4L}$ to a background pixel;
if $|P_{1L}-P_{2L}|>|P_{1L}-P_{3L}|$ set $P_{4L}$ to a foreground pixel value;
where $P_{1L}$ is the pixel value P corresponding to pixel value location L in the first set of pixel values;
where $P_{2L}$ is the pixel value P corresponding to pixel value location L in the second set of pixel values;
where $P_{3L}$ is the pixel value P corresponding to pixel value location L in the third set of pixel values; and
where $P_{4L}$ is the pixel value P corresponding to pixel value location L in the set of determined binary pixel values.

15. The apparatus of claim 13, wherein said first filtering operation removes dark image features narrower than a width of the first filtering operation that is performed by said first filter means to generate said second set of pixel values.

16. The apparatus of claim 15, wherein said first filter means include a quick close filter.

17. A non-transitory computer readable medium embodying computer executable instructions for controlling an apparatus for processing a first set of pixel values corresponding to a portion of an image, the first set of pixel values including multivalent pixel values, each multivalent pixel value corresponding to a pixel-value location in the portion of an image, the non-transitory computer readable medium comprising:

instructions for causing the apparatus to perform a first filtering operation on said first set of pixel values to generate a second set of pixel values, each pixel value in said second set of pixel values being not less than a corresponding pixel value in the first set;

instructions for causing the apparatus to perform a second filtering operation on said first set of pixel values to generate a third set of pixel values, each pixel value in said third set of pixel values being not more than a corresponding pixel value in the first set;

instructions for causing the apparatus to determine, for each of a plurality of pixel value locations in said portion of an image, a bivalent pixel value, based on the corresponding pixel values in at least two of said first, second and third sets of pixel values; and instructions for causing the apparatus to store in a storage device, a set of determined bivalent pixel values corresponding to said portion of an image.

* * * * *